F. J. FLANDERS.
AUTOMOBILE SIGNAL.
APPLICATION FILED MAR. 9, 1918.
1,286,979.
Patented Dec. 10, 1918.
2 SHEETS—SHEET 2.
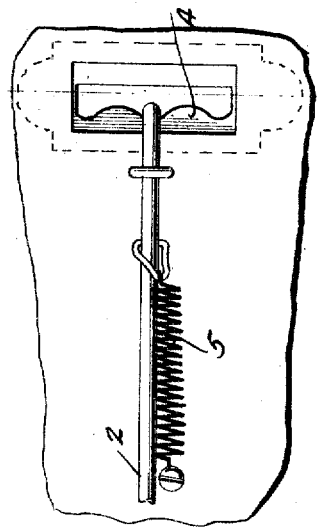
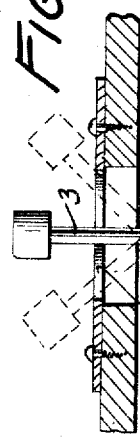
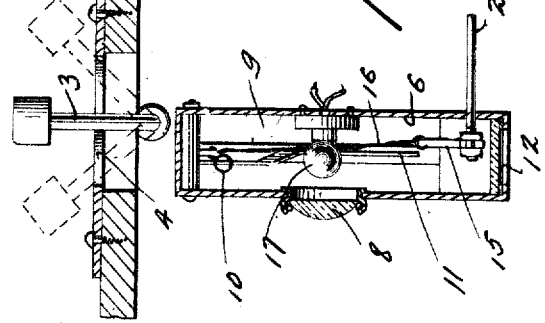
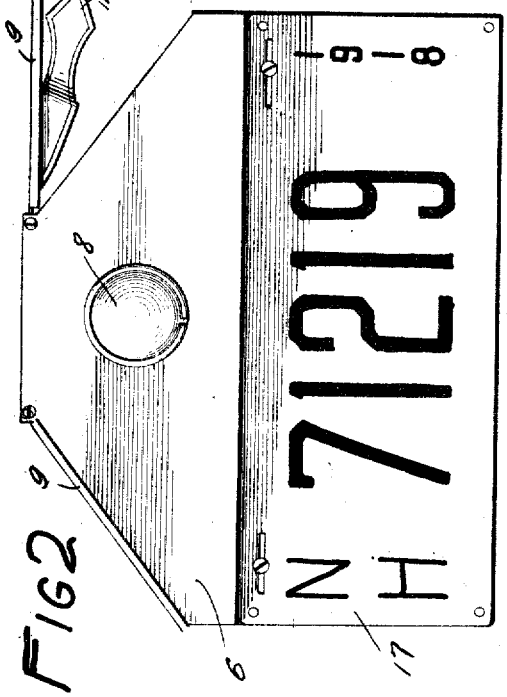
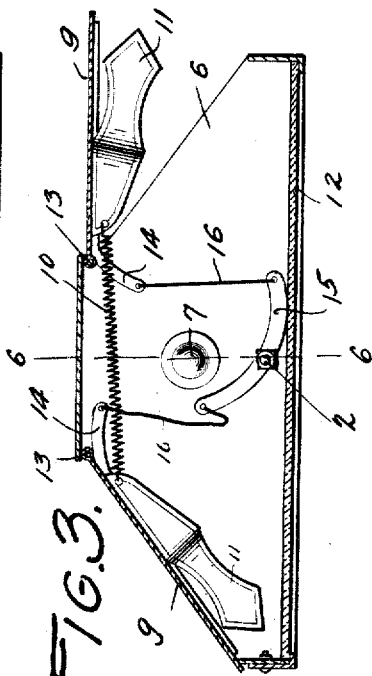
INVENTOR
Frank J Flanders
WITNESSES
BY
ATTORNEY

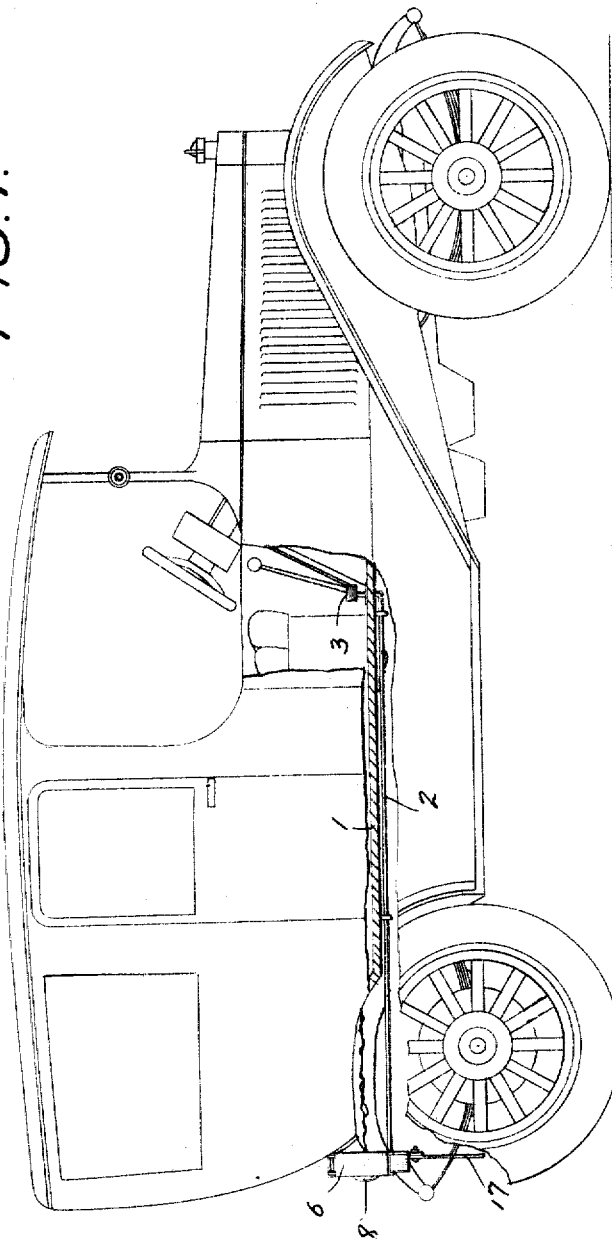

UNITED STATES PATENT OFFICE.

FRANK J. FLANDERS, OF CONCORD, NEW HAMPSHIRE.

AUTOMOBILE-SIGNAL.

1,286,979.

Specification of Letters Patent. Patented Dec. 10, 1918.

Application filed March 9, 1918. Serial No. 221,538.

*To all whom it may concern:*

Be it known that I, FRANK J. FLANDERS, a citizen of the United States, residing at Concord, in the county of Merrimack and State of New Hampshire, have invented certain new and useful Improvements in Automobile-Signals, of which the following is a specification.

The invention has relation to signaling means whereby the driver of a motor vehicle may give proper notice of his intention when desiring to make a turn, so that the operator of a vehicle in the rear may be duly advised so as to govern himself accordingly and thereby avoid a collision. The signaling means also enables the direction of turn to be indicated, and by enlarging the invention, the same may be utilized for signaling ahead as well as in the rear, thereby giving proper warning to pedestrians as well as to drivers of motor vehicles and other conveyances.

The invention combines light and semaphore signaling means, the latter being illuminated at night by the rays of light radiating from the lamp of a vehicle light so that the signal devices may be properly and clearly observed after night.

A further purpose of the invention is the provision of vehicle signaling means under control of the operator, the actuating means also serving as indicating means for properly positioning the signal devices so that the operator may be assured that the proper signal is positioned.

The drawing illustrates a preferred embodiment of the invention, however it is to be understood that in adapting the same to meet different conditions, various changes in the form, proportion, and minor details of construction, may be resorted to without departing from the nature of the invention as claimed hereinafter.

In the drawings:

Figure 1 is a view in elevation of an automobile provided with signaling means embodying the invention, a portion being broken away to indicate more clearly the relation of the parts.

Fig. 2 is a view in elevation of the signal, one of the signaling elements being exposed and in operative position.

Fig. 3 is a sectional view of the signal.

Fig. 4 is a detail view of the signal operating means showing the parts on a larger scale.

Fig. 5 is a section on the line 5—5 of Fig. 4 looking in the direction of the arrows.

Fig. 6 is a transverse section of the signal on the line 6—6 of Fig. 3.

Corresponding and like parts are referred to in the following description and indicated in all the views of the drawings by like reference characters.

The automobile illustrated in Fig. 1 is typical of the class of vehicles for which the signal is designed and is illustrated to demonstrate the application of the invention. Beneath the floor 1 of the vehicle is disposed a rod or shaft 2 which extends lengthwise of the vehicle and is connected with the signal operating means. An arm 3 projects upwardly from the shaft 2 and is disposed within convenient reach of the foot of the operator and is adapted to act jointly with a notched plate 4 whereby the signal may be held either in a neutral position or so as to indicate a turn to the right or a turn to the left. The three positions of the signal are indicated by the full and dotted lines in Fig. 5. A suitable spring 5 coöperates with the shaft 2 for holding it in a given or neutral position in conjunction with the notched plate 4.

It is to be understood that it is proposed to arrange a signal at any desired point of the vehicle either in the front or in the rear, or at both ends thereof although Fig. 1 of the drawings shows the signal disposed at the rear of the vehicle.

The signal comprises a suitable case 6 in which is disposed a lamp 7 of any nature. A lens or bull's eye 8 is provided in the outer or front wall of the case to admit of the rays of light shining therethrough when the signal is adapted for use as a tail lamp the lens or bull's eye 8 is colored red to indicate danger. When the signal is designed for use as a forward lamp the lens 8 may be white or of any desired color. The upper opposite corner portions of the case are cut away and are closed by means of hinged covers 9. The covers 9 are adapted to swing upwardly at their outer edges. The covers close by the combined action of gravity and a contractile helical spring 10, the latter being connected at its ends to said covers as shown most clearly in Fig. 3. Each of the covers is provided with a suitable semaphore or signaling member 11 which is shown as the approximate shape of an arrow. The face of the signaling member may be of any color to insure the same being readily seen when exposed to view. The semaphore or signaling member 11 is attached to the cover in any manner so as to move therewith and is disposed with its broad side approximately in vertical position whereby it may be seen to the best advantage. The lamp 7 and the signaling members 11 are so disposed that when one or the other of the covers is thrown into open position, the light will illuminate the face of the signal exposed for observation. To insure illumination of the signal, a reflector or mirror 12 is disposed at the bottom of the case and throws the rays of light upward in a manner to illuminate the members 11 in a manner to be well understood. The covers 9 are hinged at 13 and these points 13 also represent the axes of the signaling members. Arms 14 extend inward and are connected at their inner ends to the arms of the lever 15 secured at a central point to the rod or shaft 2. Flexible connections 16 serve as means for joining the arms 14 with the arms of the lever 15. In one position of the lever 15 one of the connections 16 is taut and the other connection is slack and in the other extreme position of the lever 15 the condition of the connections 16 is the reverse of that illustrated in Fig. 3. When the lever 15 is in approximately horizontal position both levers 9 are closed and both the signaling elements 11 are housed within the case and are hidden from observation. When the arm 3 is moved to the right, the shaft 2 is rotated in a clock-wise direction thereby moving the lever 15 into the position indicated in Fig. 3 and exposing the right hand signaling member 11 so as to indicate that it is the intention of the driver to turn to the right. Movement of the arm 3 to the left causes the shaft 2 to turn in an anti-clock-wise direction thereby bringing the lever 15 into a position the reverse of that shown in Fig. 3 with the result that the left hand cover 9 is thrown open and the left hand signaling member 11 is exposed to view, thereby indicating that it is the intention of the driver of the vehicle to make a turn to the left.

As indicated in Figs. 1 and 2 a number plate 17 is attached to the casing 6 so as to receive the benefit of the light radiated from the lamp 7 for illumination. In this connection, it is to be noted that a portion of the glass plate 12 only may be silvered or provided with a reflecting surface, and a portion is left plane so that the light may shine therethrough and illuminate the number plate 17. It is to be noted that the rod or shaft 2 may be extended so as to operate the front as well as the rear signal so that both signals may be operated simultaneously. The position of the arm 3 indicates to the driver or operator of the vehicle the condition of the signaling means, and by reason of the connecting means between the signaling members and the operating part, confusion is avoided because when the arms 3 is moved to the right the driver may rest assured that the right hand signal is exposed or set and when the arm 3 is moved to the left, the driver may feel certain that the left hand signal is exposed. In this manner, the driver of a vehicle in the rear may be warned in time of the intention of the driver ahead to make a turn and also as to the direction of the turn, thereby reducing the chances of collision to the smallest amount possible.

What I claim is:

1. Vehicle signaling means, comprising oppositely disposed signaling members, an operating member pivoted between its ends, flexible connections between the ends of the operating member and the respective signaling members, and means for imparting an oscillatory movement to the pivoted member to throw one or the other of the signaling members into operative position.

2. Vehicle signaling means, comprising oppositely disposed pivoted signaling members, having inwardly extending arms, an operating member pivoted between its ends, flexible connections between the ends of the operating member and the arms of the respective signaling members, means for imparting an oscillatory movement to the pivoted member, and a contractile spring, connecting the signaling members and normally holding them in a withdrawn position.

3. Vehicle signaling means, comprising a case, covers closing the upper portion of the case and pivoted at their inner ends, signaling members connected with the covers and normally disposed within the case, an operating member pivoted between its ends, and flexible connections between the ends of the operating member and the signaling members to admit of either one of the covers being moved into open position, so as to expose the signaling member connected thereto.

4. Vehicle signaling means, comprising a case, having its lower portion and its upper side portions open, a transparent plate closing the lower side of the case, covers closing the upper side portions of the case and pivoted at their inner ends thereto, signaling members connected to the covers and normally disposed within the case, means yieldably holding the covers in closed position, an operating member pivoted between its ends, flexible connections between the ends of the operating member and the covers and signaling members, operating means for the pivoted member, and a lamp disposed within the case for shedding rays of light through the lower transparent plate and the upper side openings when the covers thereof are moved into open position to illuminate the signaling members connected thereto.

In testimony whereof I affix my signature in presence of two witnesses.

FRANK J. FLANDERS.

Witnesses:
ALBERT H. DOGGETT,
JAMES F. KELLY.